April 13, 1926.
C. J. TRAVERS
GUARD FOR BEARINGS
Filed April 14, 1922
1,580,701
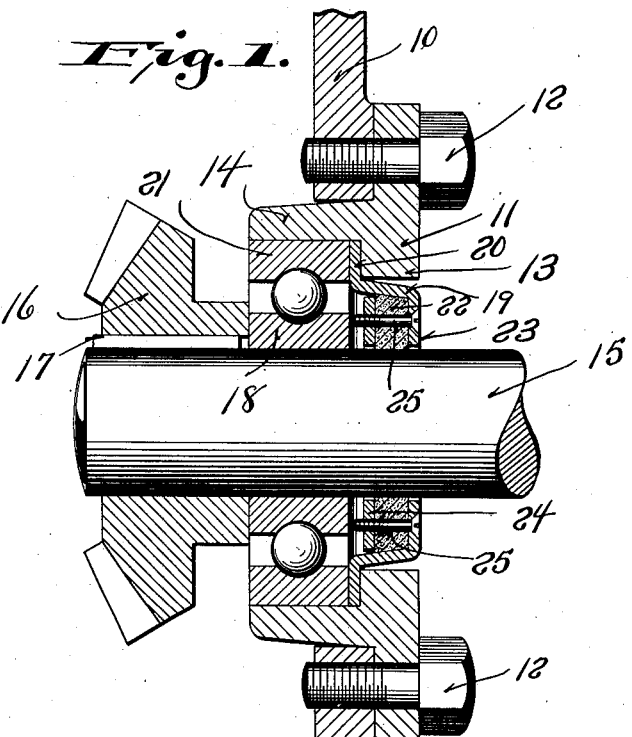
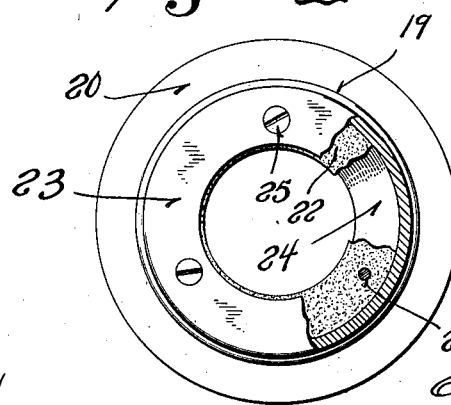
Witness:
R. E. Weber
Inventor:
Charles J. Travers
By
Attorneys Patented Apr. 13, 1926.

1,580,701

UNITED STATES PATENT OFFICE.

CHARLES J. TRAVERS, OF PORT WASHINGTON, WISCONSIN, ASSIGNOR TO GILSON MANUFACTURING COMPANY, OF PORT WASHINGTON, WISCONSIN, A CORPORATION OF WISCONSIN.

GUARD FOR BEARINGS.

Application filed April 14, 1922. Serial No. 552,778.

*To all whom it may concern:*

Be it known that I, CHARLES J. TRAVERS, a citizen of the United States, and resident of Port Washington, in the county of Ozaukee and State of Wisconsin, have invented certain new and useful Improvements in Guards for Bearings; and I do hereby declare that the following is a full, clear, and exact description thereof.

The invention relates to means for protecting bearings from dirt.

Hitherto in the use of bearings, difficulty has been experienced because of the incomplete exclusion of grit and other foreign substances which create friction and wear down the parts.

In the novel device, provision is made of a compressible annulus surrounding the rotary shaft, metallic members contacting with the faces of the annulus and means for moving these metallic members together to cause the compressible material to press against the shaft. In this way, all possibility of dirt traveling along the shaft and getting into the bearings is removed. A suitable cap is provided for supporting the guard so that the bearings are entirely protected from dust.

An important object of the invention is the provision of means for readily adjusting the force exerted on the compressible material to direct it against the shaft.

An additional object is the provision of the dust guard in a self contained unit so that it may be manufactured and sold separately from the bearings and readily placed in position, the parts of the guard being assembled in one unitary structure.

Additional objects are the provision of a device simple to manufacture and durable.

Other objects and advantages will appear as the description proceeds.

Reference is had to the accompanying drawings, in which—

Figure 1 is a central cross section of the dust guard as applied to a ball bearing, and Figure 2 is an elevation of the guard.

Transmission case 10 is provided with a cap 11 suitably secured thereto by bolts 12. A flange 13 is inwardly directed from the cap and integral with an upstanding collar 14. A rotatable shaft 15 is secured to a gear 16 by key 17 and bearing 18 is mounted on the shaft. In the dust guard, a shield 19 is provided with a flange 20 contacting with flange 13 on one side, and bearing 21 on the other. The outer surface of flange 20 and bearing 21 contacts with the inner surface of collar 14 so that a rigid structure results. An annulus 22 of felt or the like compressible material rests on an inwardly directed flange 23 of the shield, and a washer 24 abuts against the other side of the annulus, screws 25 being directed thru flange 23 and washer 24 for compressing the felt against shaft 15.

In assembling the device, the shield, which is self contained, as is apparent, is brought into its position with flange 20 in contact with flange 13, then cap 11 is moved relatively to the bearings to the position shown in Figure 1.

Obviously the dust guard is not limited to the specific bearing shown, as a roller bearing, or any type of bearing, might be similarly protected by the guard.

During the operation of the device, the rotation of shaft 15 will tend gradually to wear away the annulus 22. By the mere adjustment by a screw driver, the screws cause washer 24 to approach the flange 23 and the annulus is directed inwardly against the shaft. In the construction described, the bearing is shown as applied to a transmission case, but the invention is not limited to this specific application. In this embodiment, however, it will be noted that there is no possibility of dust or other dirt getting to the bearings, as the dust guard protects one side and the other side of the bearing is protected by the general structure of the transmission case.

Where both sides of a bearing are exposed, a pair of guards may be utilized.

While a preferred embodiment of the invention has been illustrated and described, it is to be understood that the present invention is not confined to such specific embodiment, but may be otherwise embodied within the spirit of the invention and the scope of the following claim, and it will further be understood that a substantial range of equivalence is contemplated.

I claim:

The combination of a shaft, a bearing therefor, a support for said bearing having a flange extending inwardly and located closely adjacent the end of said bearing, and a dust guard comprising a cup-shaped member having conical walls and having a central aperture for said shaft and having an outer flange located in binding relation between the end of said bearing and the flange of said bearing support, a fibrous washer seated within said cup-shaped member in contact with the conical walls, a metallic washer surrounding said shaft and in contact with said fibrous washer, and screws carried by said cup-shaped portion passing through said fibrous washer and threaded into said metallic washer and free from said bearing and having heads accessible from the outer side of said cup-shaped member.

In testimony that I claim the foregoing I have hereunto set my hand at Port Washington, in the county of Ozaukee and State of Wisconsin.

CHARLES J. TRAVERS.